(12) United States Patent
Murao

(10) Patent No.: US 6,400,517 B1
(45) Date of Patent: Jun. 4, 2002

(54) MAGNETIC MEDIA PROCESSING DEVICE

(75) Inventor: Hiroshi Murao, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/617,244

(22) Filed: Jul. 14, 2000

(30) Foreign Application Priority Data

Aug. 19, 1999 (JP) ............................................ 11-232391

(51) Int. Cl.⁷ ............................. G11B 25/04; G11B 5/09
(52) U.S. Cl. ............................... 360/2; 360/46; 360/51; 235/449; 235/436
(58) Field of Search ..................... 360/2, 46; 235/449, 235/436

(56) References Cited

U.S. PATENT DOCUMENTS 4,264,934 A * 4/1981 Mattes .......................... 360/2

5,689,105 A   11/1997 Mizoguchi et al. ......... 235/475

* cited by examiner

Primary Examiner—Regina Y. Neal
(74) Attorney, Agent, or Firm—Dickstein Shapiro Morin & Oshinsky LLP

(57) ABSTRACT

A magnetic media processing device including an encoder for producing an output for a predetermined distance in a conveyance distance of a magnetic media on conveyance, a road circuit device for reading magnetic data stored in the magnetic media in synchronizing the output from the encoder to be processed as to its waveforms to produce read data, and an arithmetic device for converting a data length to data of a distance based on a time component of a data length of the read data of the read circuit device by employing the output signal from the encoder to read data based on distance data, wherein the arithmetic device compensates the process delay time in a time component of read data produced from the read circuit device when the arithmetic device converts the data length into the data of distance.

12 Claims, 6 Drawing Sheets

MAGNETIC MEDIA PROCESSING DEVICE

BACKGROUND OF THE INVENTION

1. Field of the Invention

This invention relates to a magnetic media processing device for reading magnetic data magnetically recorded on a magnetic media such as a magnetic card to be processed thereby.

2. Description of the Related Art

A conventional magnetic card processing device provided with a function for reading and writing magnetic data on a magnetic card employs a conveyance monitoring method for performing the reading-and-writing process with a high accuracy even though the conveyance speed of the magnetic card varies.

The conventional magnetic card processing device employing the conveyance monitoring method is shown in FIG. 1. Upper and lower pair of rollers 11 and 12 conveying a magnetic card 10 are arranged in a direction of conveyance, and rotated in a predetermined conveyance direction by pulleys 13 fixed on ends of shafts of the rollers which are driven by a motor 14 through a worm, a worm wheel and a belt 15. The motor 14 is controlled to drive the conveyance rollers 11 and 12 and convey the magnetic card 10 in a predetermined direction.

A magnetic head 16 for executing a magnetic process of reading and writing magnetic data is disposed in a middle position of the pair of conveyance rollers 11 to correspond to a magnetic stripe 17 of the magnetic card 10.

Beside the head 16 there are disposed a detection roller 19 of a rotary encoder 18 and the magnetic head 16 on the same line in a width direction of the conveyance direction. The detection roller 19 is pushed by a pusher roller 20 to catch the conveyed magnetic card 10, whereby the roller 19 is rotated by the conveyance of the magnetic card 10.

The detection roller 19 is connected with a slit disc 21 having slits formed on a circumference thereof at predetermined equal intervals each of which is detected by a light projector 22 and a light receiver 23, whereby a pulse signal is generated for each predetermined distance corresponding to a conveyance travel of the magnetic card 10.

A conventional write circuit of the conventional magnetic card processing device is shown in FIG. 2, wherein a signal "a" from the light receiver 23 of the rotary encoder 18 is processed by an encoder waveform processing circuit (encoder processor) 24 to form a pulse signal "b" of a square wave which is applied to a write circuit 25 which generates an output signal "c" of writing data synchronized with the pulse signal "b" to be written into the magnetic stripe 17 by the magnetic head 16.

A conventional magnetic data reading circuit of the magnetic card processing device is shown in FIG. 3. The signal "a" from the light receiver 23 of the rotary encoder 18 is converted to the pulse signal "b" of square waves by the encoder waveform processing circuit 24 to be outputted to a CPU (central processing unit) 26. A signal read by the magnetic head 16 is amplified by an amplifier 27 to generate an amplified signal "d" which is differentiated by a differentiator 28 to detect its peaks. A signal "e" of the detected peaks is compared with a slice level by a comparator 29, and the read signal "f" is applied to the CPU 26. The magnetic head 16, the amplifier 27, the differentiator 28, and the comparator 29 provide a read circuit means of this device.

In the CPU 26 the time lapse of each time "tc" of rise and fall of the read signal "f" is timed to be stored, the lapse of time "td" of rise of the pulse signal "b" from the rotary encoder 18 is timed to be stored, and the movement travel A of the magnetic card 10 between pulses of the pulse signal "b" is previously obtained and known, whereby data of distance is made from time components of the data lengths.

In FIG. 3, for instance, a distance (data length) P corresponding to data "0" of the read signal "f" is computed out by the lapse time tc1 and tc2 of rise and fall of signals before and after the data and lapse time td1, td2, td3 and td4 of the pulse signal "b" before and after each time based on the equation (1) below;

$$P = A \times (td2-tc1)/(td2-td1) + A + A \times (tc2-td3)/(td4-td3) \quad (1)$$

According to this equation, a time length of the read signal corresponding to data "0" and "1" may be converted to a distance. This is a conveyance monitoring method, wherein data of "0" and "1" is judged after such conversion to the distance, thereby reading data even if the conveyance speed is changed.

This conventional method, however, has the disadvantages below.

When a proper circuit for improving a reading ability about a low output card is installed into the read circuit means (16, 27, 28 and 29), particularly the differential circuit 22, a processing delay of waveforms happens on reading.

As a rapid speed change happens between several bits of the pulse signal "b" based on deformation of the card or dirt adhered to the same, an error of the above-described distance conversion becomes enlarged, resulting into reading error at worst.

In FIG. 4, for instance, as a speed change happens in the magnetic card 10 at a point "x", a time length T2 of the pulse signal "b" of the rotary encoder 18 is expressed by the following equation;

$$T2 = td4 - td3$$

wherein an elapse time tc2 of fall of the read signal "f" is located in the time length T2.

Accordingly, when the read signal "f" before and after of the point "x" is converted into distance, the time length T1 of the pulse signal "b" in the distance P1 is represented by the following equation;

$$T1 = td2 - td1$$

Since an elapse time tc1 of the rise of the read signal "f" is located in the time length T1, the above described distance P1 is computed out by these elapse data according to the above-mentioned equation (1).

During the time lengths T1 and T2 of the pulse signal "b" of the rotary encoder 18, the magnetic card 10 is conveyed by same distance A, and the average speeds of A/T1 an A/T2 are different, whereby the distance by the time "t" of the average speed of A/T1 is different from the distance by the time "t" of the average speed of A/T2, thereby causing an error in the distance.

When the peaks or the signal "d", viz., the peaks of the signal "d" produced from the amplifier 27 are converted into a distance in FIG. 4, the error may be absorbed because it is small. As described above, however, a process delay time "ta" for processing waveforms exists in the differentiator 28, and is regarded as time for conveying the magnetic card 10 whereby error of the above-mentioned distance is enlarged.

For instance, in FIG. 4, when the distance conversion is executed by peaks of the signal "d", the error is so small that the distance P1 and P2 are converted as distances corresponding to two pulses (line "g"). When the distance conversion is executed by the read signal "f", the above-mentioned process delay time "ta" is treated as the time for conveying the magnetic card 10, whereby the error of the distance is enlarged. The distance P1 is converted as a distance for 1.8 pulses (line "h") and the distance P2 is converted as a distance for 2.2 pulses, so that error of the distance conversion is large resulting into reading error at worst.

To avoid the process delay of waveforms of the differentiator 28, there may be proposed a read circuit means for correcting the phase into complete 90 degrees by differential, in which an output reduction portion "y" appears in processed waveforms of a signal "j" of FIG. 5 which is a exact differentiated output, thereby providing a status that a low output card seems to be accessed. When the output decrease portion "y" becomes large, one pulse is regarded as two pulses in the succeeding atop, viz. the comparator 29, resulting in wrong reading.

As a result, when the waveform process delay by the read circuit means is tried to be resolved by a circuit, the reading function is lowered and such resolution cannot be performed by the circuit.

SUMMARY OF THE INVENTION

It is, therefore, an object of the present invention to provide a magnetic media processing device capable of precisely reading the read data without errors of distance conversion in spite of any rapid speed variation between several bits in a pulse output of an encoder for conveyance monitoring when read data is converted into a distance.

According to this invention, there is provided a magnetic media processing device including an encoder for producing an output for a predetermined distance in a conveyance distance of a magnetic media on conveyance, a read circuit means for reading magnetic data stored in the magnetic media in synchronizing the output from the encoder to be processed as to its waveforms to produce read data, and an arithmetic means for converting a data length to data of a distance based on a time component of a data length of the read data of the read circuit means by employing the output signal from the encoder to read data based on distance data, wherein the arithmetic means compensates the process delay time in a time component of read data produced from the read circuit means when the arithmetic means converts the data length into the data of distance.

According to this invention, when the data length is converted into the data of distance from the time component of the data length of the read data, the process delay time by the read circuit means in the time component of the data length in compensated, viz., subtracted, to be compensated to time of the data length when any process delay does not happen, whereby distance conversion is executed by exact differential. Thus, even if any speed variation happens between several bits in the pulse output of the encoder, distance conversion about the read data may be executed with a high accuracy without generating any errors.

BRIEF DESCRIPTION OF THE DRAWINGS

Other objectives and advantages of this invention will be more readily apparent from the following detailed description provided in conjunction with the following figures, of which.

DETAILED DESCRIPTION OF THE PREFERRED EMBODIMENTS

Figure 1:
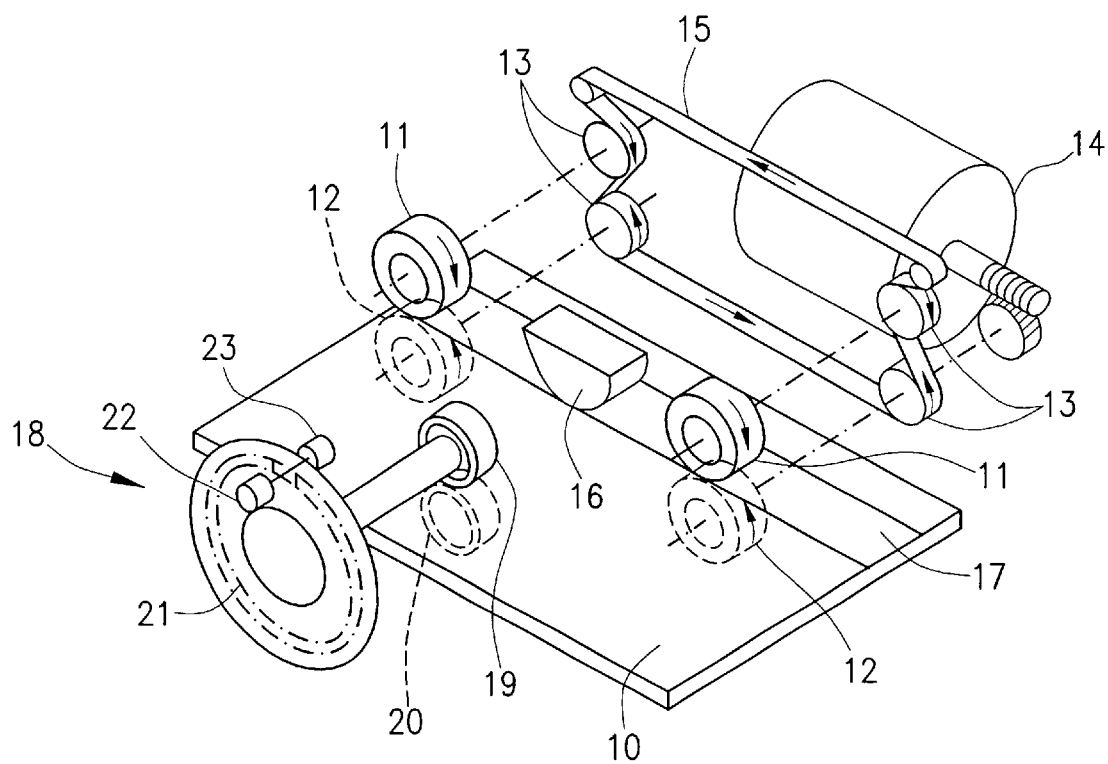
FIG. 1 is a perspective view of a magnetic card processing device.
Figure 2:
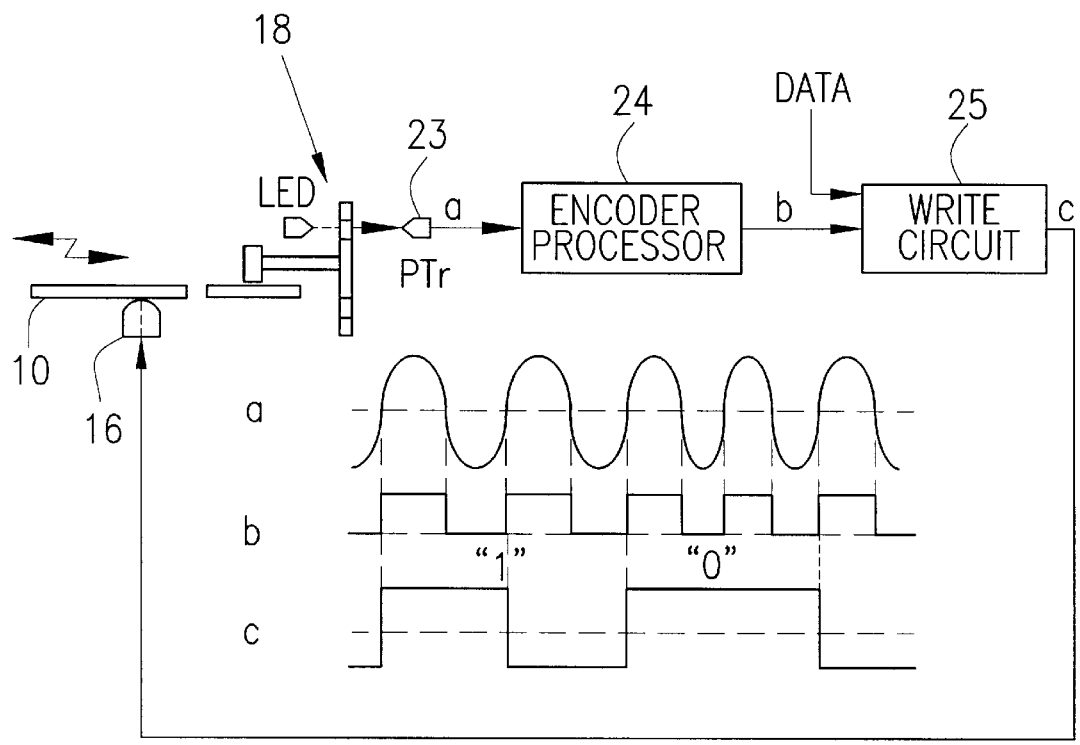
FIG. 2 is signal waveforms of a write circuit.
Figure 3:
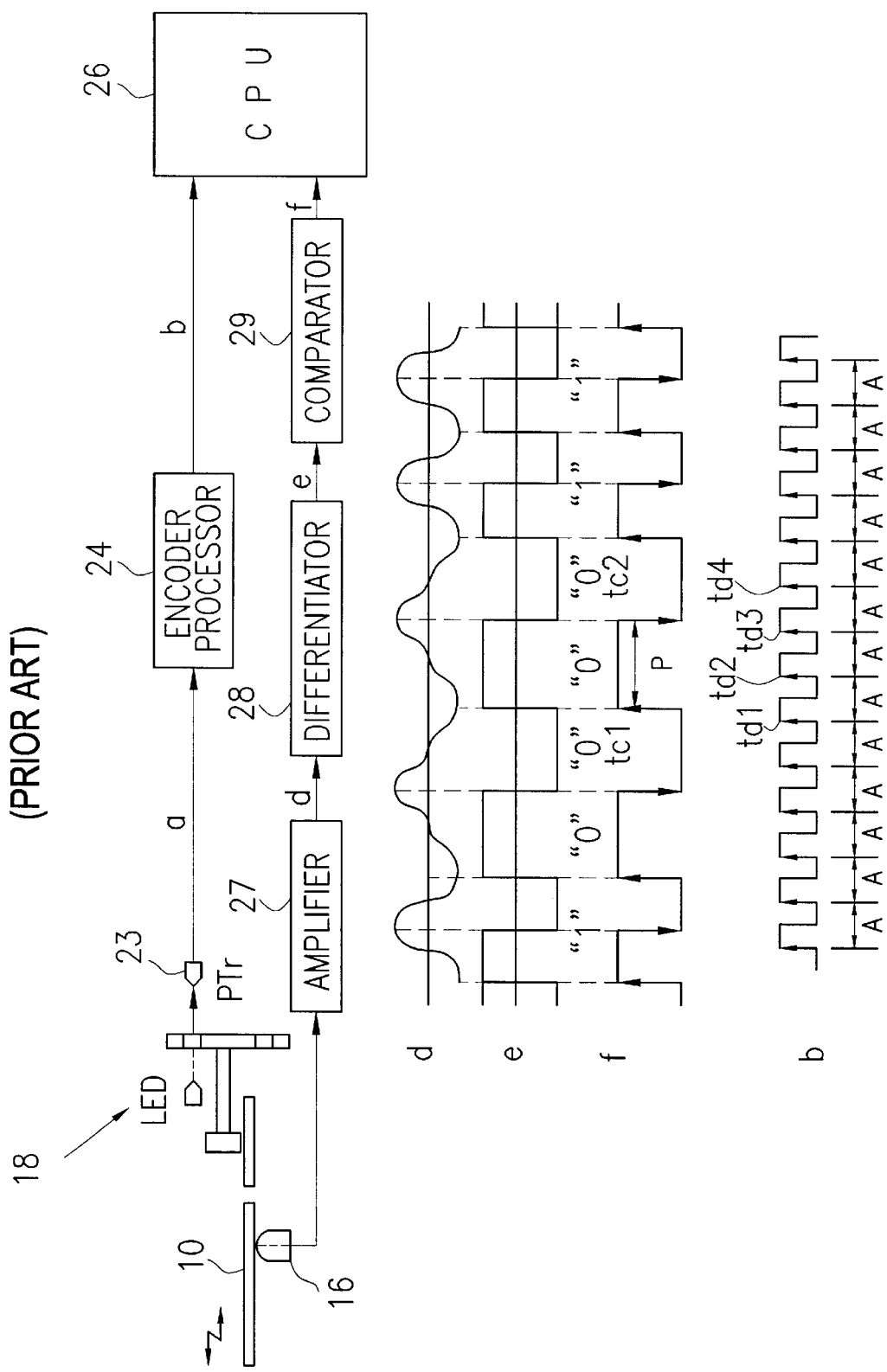
FIG. 3 is a block diagram of a tread circuit and signal waveforms.
Figure 4:
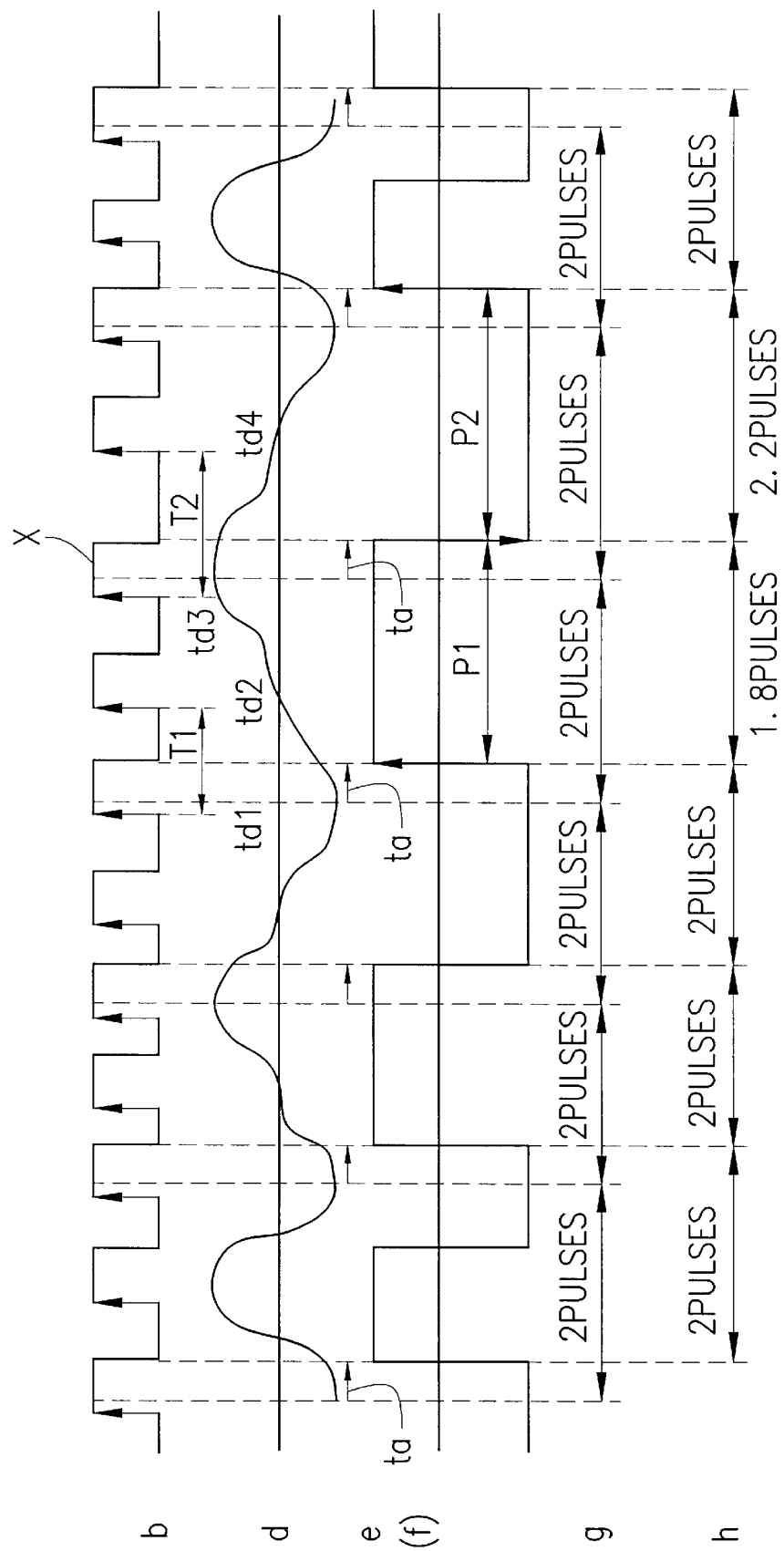
FIG. 4 shows signal waveforms illustrating a waveform process delay time.
Figure 5:
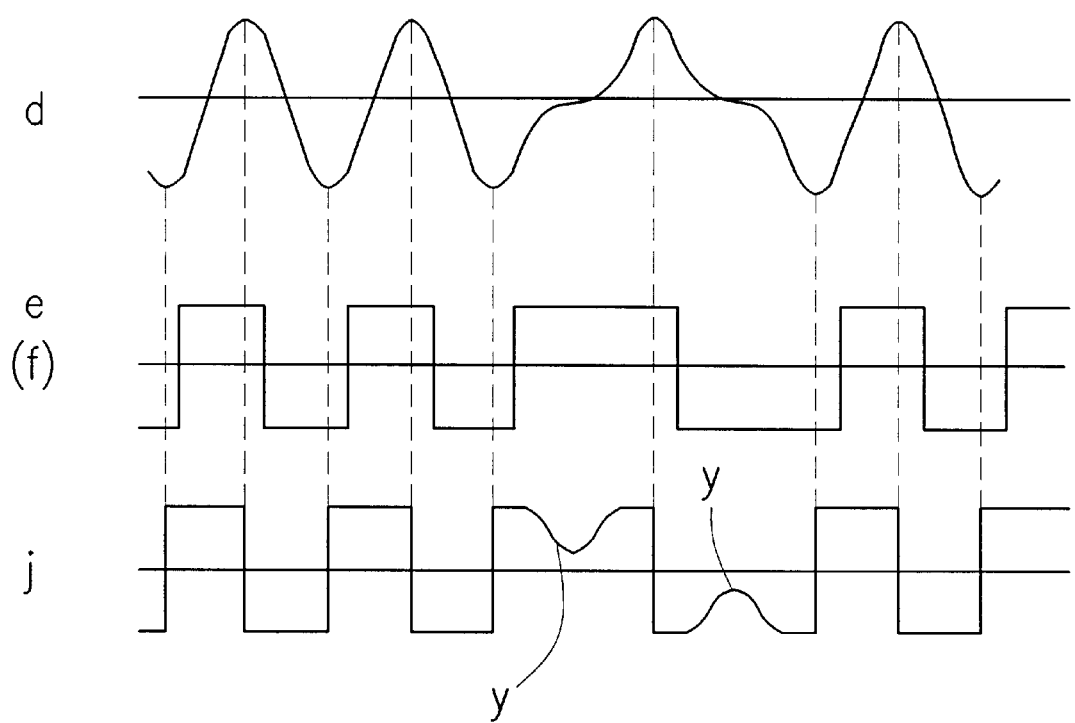
FIG. 5 shows signal waveforms by exact differential.

A magnetic media processing device according to a preferred embodiment of this invention employs the magnetic card processing device (card reader) of FIG. 1, a write circuit having the construction of FIG. 2, and a read circuit means having the construction of FIG. 3.

An arithmetic operation for converting a data length of read data into data of a distance based on a time component of the data length according to the present invention is executed in the CPU 26. The arithmetic operation according to the present invention compensates for a waveform processing. delay time "ta" in the time component of the read data produced from a read circuit means employing the magnetic head 16, the amplifier 27, the differentiator 28, and the comparator 29. The waveform process delay time "ta" may be measured in advance, and the measured value defines the time "ta".

Figure 6:
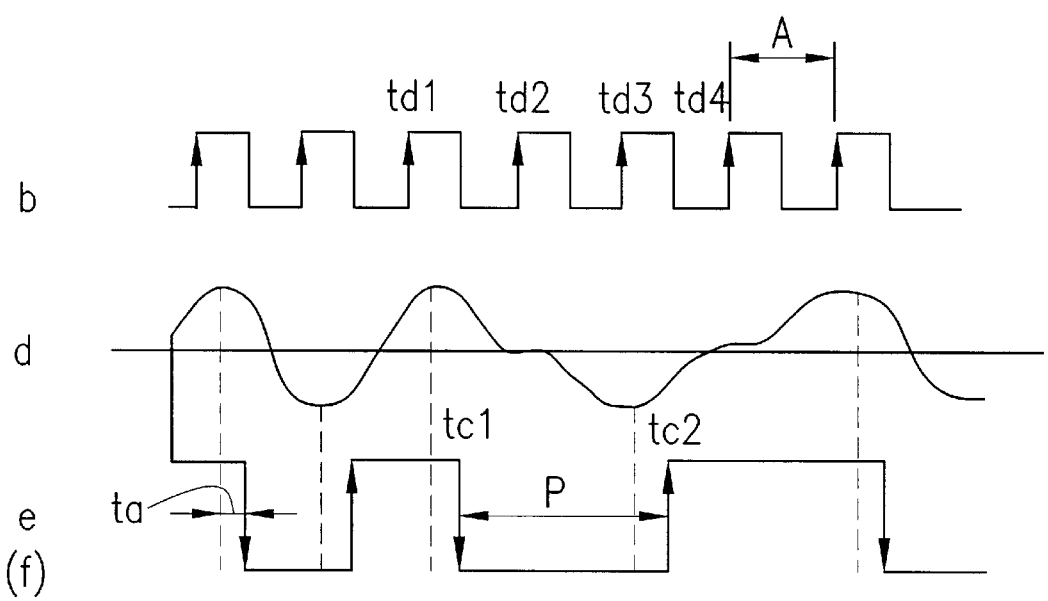
FIG. 6 shows signal waveforms for illustrating compensation against the waveform process delay according to the present invention.

The time "ta" is converted into time data by clocks of the CPU 26, and subtracts all of time data of a read signal "f" for shift. That is, in FIG. 6, the distance for the data length "P" is obtained by employing the rise and fall elapse time tc1 and tc2 before and after the data length, the elapse time td1, td2, td3 and td4 of the pulse signal "b" before and after the respective time tc1 and tc2, a waveform process delay time "ta", and a predetermined distance "A" converted into distances from distances of the pulse signal "b" according to the equation below;

$$P = A \times [td2-(tc1-ta)]/(td2-td1) + A + A \times [(tc2-ta)-td3]/(td4-td3) \quad (2)$$

wherein (tc1−ta) and (tc2−ta) is compensation for completely shifting the waveform process time "ta" to a differential side, whereby the data length P provides a distance conversion equivalent to exact differential by employing differential.

Therefore, even if any rapid speed change happens between several bits in pulse output "b" of the rotary encoder 18, any error does not appear in the distance conversion, and precise distance conversion of the read data may be performed. As a result, enough margin against read error may be ensured, and read function is improved.

In this embodiment, the rotary encoder 18 serves as an encoder, and a read circuit means is represented by the magnetic head 16, the amplifier 27, the differentiator 28 and the comparator 29. The arithmetic means is represented by the CPU 26.

Many modifications and variations may be made in the techniques and structure described and illustrated herein without departing from the spirit and scope of this invention. Accordingly, it should be understood that the techniques and structures described and illustrated herein are illustrative only and are not to be considered as limitations upon the scope of this invention.

What is claimed is:

1. A magnetic media processing device comprising
   an encoder for producing an output for a predetermined distance in a conveyance distance of a magnetic media on conveyance, read circuit means for reading magnetic data stored in said magnetic media in synchronizing the output from said encoder to be processed as to its waveforms to produce read data, and arithmetic means for converting a data length to data of a distance based on a time component of a data length of the read data of said read circuit means by employing the output signal from said encoder to read data based on distance data, wherein said arithmetic means compensates for the process delay time of said read circuit means by subtracting the processing time of said read circuit means from a time component of read data produced from said read circuit means when said arithmetic means converts the data length into the data of distance.

2. A magnetic media processing device comprising:

a conveyance device to convey a magnetic media, said magnetic media storing data;

an encoder to produce a first pulse signal based on said conveyance of said magnetic media;

a read circuit to read said data stored in said magnetic media, said read circuit providing, after a read processing time, a read data signal based on said stored data; and a processor coupled to said encoder and said read circuit, said processor converting a data length of said read data signal to distance data based on a time component of said first pulse signal, said processor subtracting the read processing time from a time component of said read data signal when said data length is converted into said distance data.

3. The device according to claim 2, further comprising:

an encoder processor coupled to said encoder and receiving said first pulse signal, said encoder processor outputting a second pulse signal based on said first pulse signal to said processor, wherein said processor converts said data length of said data read signal to said distance data based on a time component of said second pulse signal.

4. The device according to claim 3, wherein said processor converts said data length of said read data signal to said distance data based on rising and falling edges of said data read signal, rising edges of said second pulse signal, a waveform process delay time, and a cycle time of said second pulse signal.

5. The device according to claim 2, wherein said encoder is a rotary encoder.

6. The device according to claim 2, wherein said read circuit further comprises:

a magnetic head to read said data stored in said magnetic media;

an amplifier coupled to said magnetic head to receive and amplify said data read by said magnetic head to produce an amplified signal;

a differentiator coupled to said amplifier to receive said amplified signal, detect peaks of said amplified signal, and provide a differentiated signal; and a comparator coupled to said differentiator to receive said differentiated signal, compare said detected peaks to a predetermined level, and output said read data signal to said processor.

7. A processor for use in a magnetic media processing device, said processor comprising:

a first input for receiving a pulse signal from an encoder circuit; and a second input for receiving, after a read processing time, a read data signal from a read circuit, said read circuit reading data from a magnetic media, wherein said processor is adapted to convert a data length of said read data signal to distance data based on a time component of said pulse signal, said processor subtracting the read processing time from a time component of said read data signal when said data length is converted into said distance data.

8. The processor according to claim 7, wherein said processor converts said data length of said read data signal to said distance data based on rising and falling edges of said data read signal, rising edges of said pulse signal, a waveform process delay time, and a cycle time of said pulse signal.

9. A method for processing data read from a magnetic media comprising the steps of:

conveying said magnetic media;

reading said data while said magnetic media is being conveyed, wherein said reading provides a read data after a read processing time;

producing a pulse signal based on said conveyance of said magnetic media;

converting a data length of said read data to a distance data based on a time component of said pulse signal; and subtracting the read processing time from a time component of said read data when said data length is converted to said distance data.

10. The method according to claim 9, wherein said step of reading said data further comprises:

amplifying said read data;

detecting peaks of said amplified read data; and comparing said detected peaks to a predetermined level to produce a data read signal.

11. The method according to claim 10, wherein said step of compensating further comprises:

determining a time of rising and falling edges of said data read signal;

determining rising edges of said pulse signal;

determining a process delay time for said data read signal; and determining a cycle time of said pulse signal.

12. The method according to claim 11, wherein said distance data is determined by $$A*(td2-(tc1-ta))/(td2-td1)+A+A*((tc2-ta)-td3)/(td4-td3)$$

where tc1 and tc2 are said rising and falling edges of said data read signal, td1, td2, td3 and td4 are said rising edges of said pulse signal, ta is said process delay time for said data read signal, and A is a predetermined distance based on said cycle time of said pulse signal.

* * * * *